(No Model.)
D. COCHRANE.
SEPARATOR FOR PURIFYING STEAM.
No. 474,160. Patented May 3, 1892.
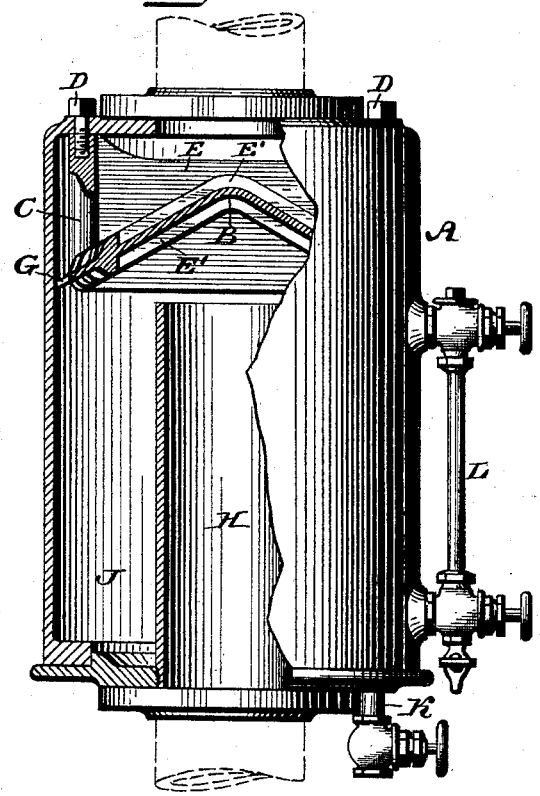
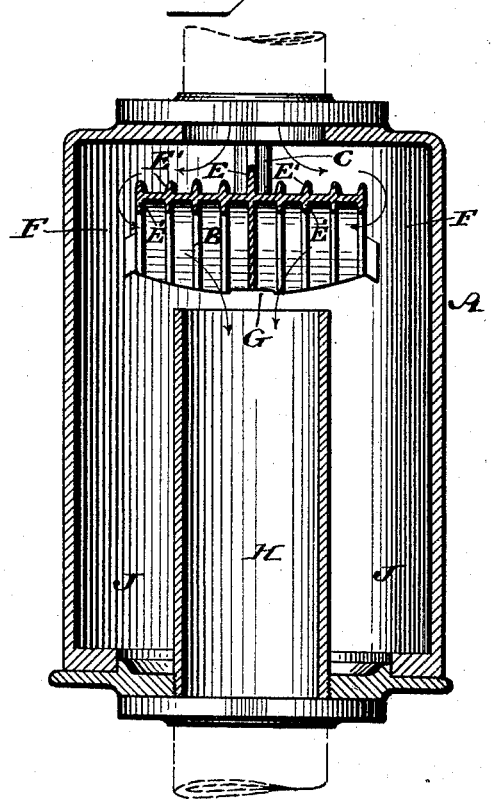
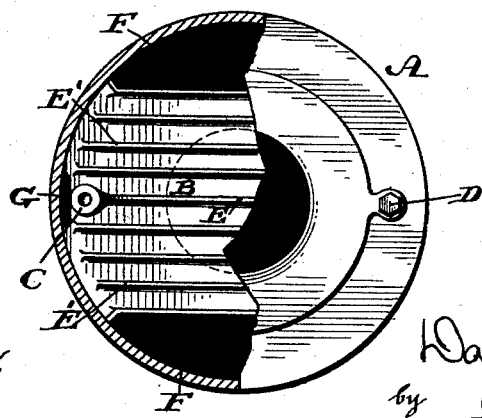
WITNESSES:
L. Douville,
P. H. Aagle.
INVENTOR
David Cochrane
by John A. Wiedersheim
Attorney.

UNITED STATES PATENT OFFICE.

DAVID COCHRANE, OF PHILADELPHIA, PENNSYLVANIA, ASSIGNOR TO THE HARRISON SAFETY BOILER WORKS, OF SAME PLACE.

SEPARATOR FOR PURIFYING STEAM.

SPECIFICATION forming part of Letters Patent No. 474,160, dated May 3, 1892.

Application filed December 24, 1891. Serial No. 416,042. (No model.)

*To all whom it may concern:*

Be it known that I, DAVID COCHRANE, a citizen of the United States, residing in the city and county of Philadelphia, State of Pennsylvania, have invented a new and useful Improvement in Separators for Purifying Steam, which improvement is fully set forth in the following specification and accompanying drawings.

My invention consists of a separator or device for purifying live and exhaust steam by removing entrained water, oil, grit, and other impurities therefrom, the same embodying a casing provided with openings for the ingress and egress of steam, and a baffle-plate whose surface is ribbed, whereby the steam entering the casing is forcibly directed against the baffle-plate and divided, causing the steam to pass around said plate to the opposite side thereof, from whence it is discharged, while the water, oil, &c., which is impacted against the plate is separated from the steam and directed into a well, where it cannot be again taken up or disturbed by the steam.

Figure 1 represents a partial side elevation and partial vertical section of a separator embodying my invention. Fig. 2 represents a vertical section thereof. Fig. 3 represents a partial plan view and partial horizontal section thereof.

Similar letters of reference indicate corresponding parts in the several figures.

Referring to the drawings, Figs. 1, 2, and 3, A designates a casing having in each of its top and bottom walls an opening where pipes are connected therewith for the ingress and egress of steam. Within the casing, near the upper part thereof, is a baffle-plate B, which is secured to the top plate thereof by means of posts C and suitable bolts D, said plate being of angular or somewhat arched form, its angle or crown projecting upwardly and its upper faces being formed with a deep rib E at the center thereof and shallow ribs E' at the sides thereof, the under face of the plate being also similarly ribbed, as will be seen in Fig. 2. Between the sides of the plate and wall of the casing are spaces which form passages F, whereby steam may pass around the plate, as will be hereinafter more fully described. In the ends of the limbs of the plate are openings or ports G for the passage of water of condensation, oil, &c., therethrough.

Rising from the bottom wall of the casing and in communication with the discharge-opening therein is a pipe H, which extends to a point below the baffle-plate and forms a well J in said casing. Connected with the bottom of the casing is the drip-pipe K for discharging the contents of the well J.

The operation is as follows: Steam is directed into the casing, and when it reaches the baffle-plate it forcibly strikes the same, and, owing to the ribs thereon, it is deflected to the right and left, and thus divided and broken. As water, oil, &c., in the steam contacts with the plate it is caught and caused to flow down the same until it reaches the openings G, when it passes through the same and drops into the well J, from whence it may be removed by the pipe K.

The steam as purified or divested of water, oil, grease, &c., passes around the baffle-plate through the passages F and enters the pipe H, by which it is directed through the discharge-pipe to the place of service.

The well of either casing is provided with a gage L for indicating the height of water, &c., therein.

Having thus described my invention, what I claim as new, and desire to secure by Letters Patent, is—

1. A separator consisting of a casing with inlet and outlet pipes at opposite ends, an arched baffle-plate secured in said casing opposite said inlet-opening by posts and bolts and having a deep rib on the center of its faces and openings in its ends, and a pipe within said casing having a surrounding well, the spaces between the sides of said baffle-plate and the casing forming steam passage-ways, said parts being combined substantially as described.

2. A separator consisting of a casing with inlet and outlet pipes, an arched-shaped baffle-plate with openings in its ends and ribs on its faces and having passage-ways at its sides between it and the casing, a pipe in said casing having a surrounding well, and a discharge-pipe leading from said well, said parts being combined substantially as described.

DAVID COCHRANE.

Witnesses:
JOHN A. WIEDERSHEIM,
L. JENNINGS.